United States Patent [19]

Miyake et al.

[11] Patent Number: 4,745,022

[45] Date of Patent: May 17, 1988

[54] COMPOSITE SINTERED SILICON NITRIDE MATERIAL AND CUTTING TOOL MADE THEREFROM

[75] Inventors: Masaya Miyake; Akira Yamakawa, both of Hyogo, Japan

[73] Assignee: Sumitomo Electric Industries, Ltd., Osaka, Japan

[21] Appl. No.: 790,496

[22] Filed: Oct. 23, 1985

[30] Foreign Application Priority Data

Oct. 23, 1984 [JP] Japan .................. 59-222818

[51] Int. Cl.⁴ .......... B32B 7/02; B32B 9/00; C04B 35/58; B24D 3/02
[52] U.S. Cl. ............... 428/216; 428/698; 428/699; 428/701; 51/309; 501/97; 501/98
[58] Field of Search .......... 428/701, 699, 698, 469, 428/457, 215, 216; 51/309, 295; 501/97, 98

[56] References Cited

U.S. PATENT DOCUMENTS

| | | | |
|---|---|---|---|
| 3,301,646 | 1/1967 | Smoot | 51/309 |
| 3,409,417 | 11/1968 | Yates | 51/309 X |
| 4,227,842 | 10/1980 | Samanta et al. | 51/309 X |
| 4,304,576 | 12/1981 | Hattori et al. | 51/309 |
| 4,441,894 | 4/1984 | Sarin et al. | 51/309 |
| 4,449,989 | 5/1984 | Sarin et al. | 428/698 X |

FOREIGN PATENT DOCUMENTS 0190271  10/1984  Japan ................. 501/97

OTHER PUBLICATIONS

"Periodic Table of the Elements", CRC Handbook of Chemistry and Physics, 63rd Ed., 1982-1983.

*Primary Examiner*—John E. Kittle
*Assistant Examiner*—Susan S. Ducker
*Attorney, Agent, or Firm*—Jones, Tullar & Cooper

[57] ABSTRACT

Composite sintered $Si_3N_4$ material particularly suitable as a cutting tool material for cutting cast iron is composed of:

a sintered $Si_3N_4$ substrate containing 0.1 to 10 weight % of $Y_2O_3$, 0.1 to 10 weight % of $ZrO_2$ and if necessary 1 to 15 weight % of at least one member selected from the group consisting of compound and solid solution thereof of elements of IVa (except Zr), Va and VIa of the Periodic Table and the balance being of $Si_3N_4$;

a first layer of Ti compound coated on the sintered $Si_3N_4$ substrate;

a second layer of $Al_2O_3$ coated on the first layer; and the total thickness of the first and second layers being in the range of 1 to 20 microns.

The above composite sintered $Si_3N_4$ material has an improved abrasive resistance particularly in the case of cutting cast iron at high speed, while retaining the excellent physical properties of $Si_3N_4$. Such a composite sintered $Si_3N_4$ material is useful for preparing a cutting tool of a long life time.

27 Claims, No Drawings

4,745,022

COMPOSITE SINTERED SILICON NITRIDE MATERIAL AND CUTTING TOOL MADE THEREFROM

FIELD OF THE INVENTION

The present invention relates to a composite silicon nitride and a cutting tool made therefrom. More particularly, the present invention relates to an improvement in abrasive resistance of the cutting tool which is used mainly for high speed cutting of cast iron.

BACKGROUND OF THE INVENTION

Hitherto, WC base sintered alloy has been widely used as a tool for cutting steel or cast iron and as an abrasion and impact resisting tool, because of its excellent properties such as abrasive resistance, heat resistance, corrosion resistance, etc. Because of the recent shortage in the natural source of tungsten, however, new materials such as cermets, ceramics and sintered diamond have been developed for use in place of WC tools and put to some practical use.

Among these new materials, $Al_2O_3$ base ceramics such as the so-called white ceramics and black ceramics have been widely used as tools for cutting cast iron at high speed.

But, $Al_2O_3$ base ceramics do not present high mechanical properties, particularly they do not present sufficiently excellent properties with respect to fracture toughness and heat impact resistance (because of the low heat conductivity, $Al_2O_3$ ceramics involve cracks due to thermal stress). Thus, it is difficult to prepare a cutting tool of long life time and high reliability. Accordingly, $Al_2O_3$ base ceramics have been employed only in a restricted usage.

On the other hand, non-oxide ceramics such as nitride, carbide, silicate, etc have been developed and become the object of the attention of the cutting tool manufacturers. Among them, silicon nitride (which will be referred to as "$Si_3N_4$" hereinafter) base ceramics present prominently excellent properties regarding fracture toughness and heat impact resistance, etc., and the chipping amount thereof during cutting operation is ordinarily low. Thus a cutting tool of $Si_3N_4$ having a life time sufficiently long for practical use is now being developed.

$Si_3N_4$ base ceramics present, however, the following problems:

First, in the case of steel cutting, the cutting tool of $Si_3N_4$ suffers from abnormal chipping and abrasion due to the reaction between Si and Fe.

Second, compared with $Al_2O_3$ base ceramics, $Si_3N_4$ base ceramics present a low abrasive resistance under high speed cutting conditions.

For overcoming these defects, there has been proposed, in Japanese Patent Laid-Open No. 1308/1979, a process for applying $Si_3N_4$ with a coating of ceramic having a high abrasive resistance such as $Al_2O_3$ etc.

Although the above prior art process is effective to some extent, the adhesion between the substrate and the coating is not sufficiently strong and thus there remain some problems to be resolved.

In the prior art processes, $Si_3N_4$ is hot pressed together with a sintering agent such as $Al_2O_3$, MgO and $Y_2O_3$. Otherwise $Si_3N_4$ is mixed with $Al_2O_3$, AlN, $Y_2O_3$, etc., so that the so-called sialon compound (which is believed to be composed mainly of Si-Al-O-N) is formed. The mixture is then sintered or hot pressed in a nitrogen atmosphere. These prior art processes, however, necessitate the addition of $Al_2O_3$ and is not sufficiently effective to provide a cutting tool of long life time.

SUMMARY OF THE INVENTION

Accordingly, an object of the present invention is to provide a composite sintered $Si_3N_4$ material having a sufficiently high abrasive resistance as a material for a cutting tool for cast iron.

Another object of the present invention is to provide a cutting tool having a long service life time for high-speed cutting of cast iron and other materials.

A further object of the present invention is to provide a composite sintered $Si_3N_4$ material which is usable as a blade tip of high-speed cutting tool for cast iron.

According to the present invention, there is provided a composite sintered $Si_3N_4$ material consisting of:

a sintered $Si_3N_4$ substrate containing 0.1 to 10 weight % of $Y_2O_3$ and 0.1 to 10 weight % of $ZrO_2$ and the balance being of $Si_3N_4$;

a first layer of Ti compound coated on the sintered $Si_3N_4$ substrate;

a second layer of $Al_2O_3$ coated on the first layer; and the total thickness of the first and second layers being in the range of 1 to 20 microns.

According to a preferred embodiment of the invention, $ZrO_2$ has been stabilized to cubic $ZrO_2$, preferably by the addition of at least one member selected from the group consisting of CaO, MgO and $Y_2O_3$.

According to another preferred embodiment of the invention, the mean grain size of the sintered $Si_3N_4$ substrate is smaller than 3 microns.

According to a still further preferred embodiment of the invention, the first and second layers have respectively a thickness of 3 to 10 microns. It is further preferable that the first and second layers have substantially the same thickness.

The first layer has preferably a thickness of 0.5 to 10 microns, and the second layer has preferably a thickness of 1 to 10 microns.

According to still another embodiment of the invention, the first layer includes at least one member selected from the group consisting of Ti carbide, Ti nitride, Ti carbonitride, Ti oxide and the solid solution thereof.

According to the present invention, there is also provided a composite sintered $Si_3N_4$ material consisting of:

a sintered $Si_3N_4$ substrate containing 0.1 to 10 weight % of $Y_2O_3$, 0.1 to 10 weight % of $ZrO_2$ and 1 to 15 weight % of at least one member selected from the group consisting of compounds and solid solution thereof of elements of IVa (except Zr), Va and VIa of the Periodic Table and the balance being of $Si_3N_4$;

a first layer of Ti compound coated on the sintered $Si_3N_4$ substrate;

a second layer of $Al_2O_3$ coated on the first layer; and the total thickness of the first and second layers being in the range of 1 to 20 microns.

DETAILED DESCRIPTION OF THE PREFERRED EMBODIMENTS

With a view to improving the abrasive resistance of the cutting tool of $Si_3N_4$ base ceramics for high speed cutting conditions, the present inventors have conducted expriments and researches.

As a substrate of a cutting blade tip, the sintered $Si_3N_4$ should be of a high density and excellent in mechanical strength, fracture toughness, heat resistance and heat impact resistance. On the other hand, $Si_3N_4$ is a compound in which the atoms tend to be bonded together by covalent bonds, and thus $Si_3N_4$ is itself difficult to be sintered. Then, compounds of low melting point are generally used as a sintering agent.

In most of the prior art processes, the sintering agent of oxides are used such as the oxides of aluminum (Al), magnesium (Mg), yttrium (Y), rare earth metals, for example, lanthanum (La) and cerium (Ce), beryllium (Be) and zirconium (Zr).

Further, nitrides and oxinitrides of the above elements are used as a sintering agent.

In any of the above prior art processes, however, it is difficult to produce $Si_3N_4$ presenting with at the same time high mechanical strength, fracture toughness and high hardness. Further it is necessary to conduct pressurized sintering such as hot pressing in order to obtain $Si_3N_4$ of a high density. Namely, in the prior art process, $Si_3N_4$ of a relatively high density can be obtained only by the pressurized sintering method which necessitates the use of complicated equipment of low productivity. Further, it is difficult to sinter a compact of a complicated configuration by pressurized sintering, and the production cost is expensive.

As a result of experiments with various sintering agents, the present inventors found that a sintered $Si_3N_4$ excellent with respect to mechanical strength, density and hardness can be obtained by using as a sintering agent $Y_2O_3$ together with $ZrO_2$ and, if necessary, at least one member selected from the group consisting of carbides, nitrides, carbonitrides and solid solution thereof of the elements belonging to $IV_a$ (except Zr), $V_a$ and $VI_a$ groups of the Periodic Table such as Ti, Hf, V, Nb, Ta, Cr, Mo and W, and propose to apply to the thus sintered $Si_3N_4$ a coating of $Al_2O_3$ through a first coating of Ti compound which can adhere both to the $Si_3N_4$ substrate and the $Al_2O_3$ coating with high adhesive strength.

According to the invention, $Y_2O_3$ is added to the $Si_3N_4$ compact to improve the sintering property and the mechanical properties of the resulting sinter. $Si_3N_4$ is itself a material which is readily sublimed and thus is difficult to sinter. Therefore it is difficult to produce sintered $Si_3N_4$ having high density. With an addition of $Y_2O_3$, it is possible to obtain a sinter having a high density and including a microscopic fibrous structure which is believed to improve the mechanical properties.

With $Y_2O_3$ in an amount of less than 0.1 weight %, the sintering is difficult and the resulting sinter is of low density. On the other hand, if $Si_3N_4$ contains $Y_2O_3$ in excess of 10 weight %, the amount of $Si_3N_4$ in the resulting sinter becomes proportionally lesser and the properties thanks to $Si_3N_4$ itself become insignificant to an extent that the resulting sinter can not be used as a blade tip.

$ZrO_2$ is also effective for heightening the density of the sintered $Si_3N_4$ and the adhesion strength with the first coating layer of Ti compound.

More specifically, $ZrO_2$ tends to react with $Y_2O_3$ to improve the sintering property thereby to heighten the density of the resulting sinter. Further, $ZrO_2$ partially precipitates in the grain boundary to thereby improve the fracture toughness. Namely, $Y_2O_3$ reacts with $ZrO_2$ to form an amorphous material such as ZrYON in the grain boundary to bond the grain boundaries of $Si_3N_4$, which is effective for heightening the density of the sinter.

If the resulting sinter contains $ZrO_2$ in an amount lower than 0.1 weight %, the effect of the addition thereof is not significant. On the other hand, with $ZrO_2$ in an amount of higher than 10 weight %, the content of $Si_3N_4$ in the resulting sinter becomes proportionally lesser so that the sinter does not possesses the mechanical strength nor hardness required for use as a cutting tool. Accordingly, the content of $ZrO_2$ should be in the range of 0.1 to 10 weight %.

According to an embodiment of the present invention, $ZrO_2$ is cubic crystal stabilized by oxides such as MgO, CaO and $Y_2O_3$.

$ZrO_2$ has three kinds of polymorphes, that is, monoclinic $ZrO_2$(m-$ZrO_2$), tetragonal $ZrO_2$(t-$ZrO_2$) and cubic $ZrO_2$(c-$ZrO_2$). While m-$ZrO_2$ is stable up to about 1100° C., it transforms to t-$ZrO_2$ over 1100° C. and to c-$ZrO_2$ over 2370° C. These phase transformations occur in the reverse direction by cooling. Among them, it should be noted that the phase transformation between m-$ZrO_2$ and t-$ZrO_2$ is accompanied with a change in volume as large as 4%.

According to an embodiment of the present invention, c-$ZrO_2$ which has been stabilized is used as a material of the $Si_3N_4$ sinter to prevent the phase transformation of $ZrO_2$ for improving heat resistance.

$ZrO_2$ may be stabilized by adding to $ZrO_2$ anyone of MgO, CaO and $Y_2O_3$ in an amount of about 11 mol% and heating the mixture to higher than 1200° C.

According to a preferred embodiment of the invention, $Y_2O_3$ powder in an amount of 5 to 15 mol% on the basis of the amount of $ZrO_2$ is added to a $ZrO_2$ powder and the mixture is heated to higher than 1200° C. to stabilize $ZrO_2$ as c-$ZrO_2$. The resulting c-$ZrO_2$ is employed as a starting material of the sinter. The stabilization may be conducted by subjecting a mixture to a coprecipitation method, etc.

Carbides or nitrides of IVa (except Zr), Va and VIa groups of the Periodic Table are effective for improving the sintering property and at the same time preventing abnormal grain growth of $Si_3N_4$ to thereby provide a sintered material composed of fine and uniform grain. In more detail, the sintering agents of $Y_2O_3$ and $ZrO_2$ react with $SiO_2$ to form a liquid phase, in which $Si_3N_4$ is resolved. Thus the sintering proceeds while $Si_3N_4$ recrystallizes from the liquid phase. The compounds of IVa (except Zr), Va and VIa groups of the Periodic Table tend to be diffused in the liquid phase to supress the grain growth of the precipitated $Si_3N_4$.

Further, these carbides and nitrides of the element of IVa (except Zr), Va and VIa groups of the Periodic Table themselves have a high hardness and are stable at high temperatures, and therefore they are effective to provide a sinter excellent in mechanical and thermal properties. That is, $Si_3N_4$ has generally a low hardness and an abrasive resistance because Si has a high affinity with Fe and presents a low hardness. To the contrary, the carbides and nitrides of the element of IVa (except Zr), Va and VIa groups of the Periodic Table have a low affinity with Fe and present a high hardness, so that they are effective for improving the abrasive resistance of the cutting tool containing the same. The addition of these carbides or nitrides together with $Y_2O_3$ and $ZrO_2$ enables the attainment of a sintered material having a high abrasive resistance which can not be attained only with the addition of $Y_2O_3$ and $ZrO_2$.

These elements of IVa, Va and VIa groups of the Periodic Table may be contained in the $Si_3N_4$ sinter in any form of carbide, nitride, solid solution and admixture thereof and the adding effect thereof is the same in any case.

Further, the elements belonging to IVa, Va and VIa groups have a low reactivity with Fe and the addition thereof is effective for improving the abrasive resistance of the tool for cutting cast iron.

The adding amount of carbides, nitrides or solid solution of IVa (except Zr), Va and VIa groups of the Periodic Table is defined on the basis of the amount of these elements in the sintered material. If the content of these element in the sintered material is lower than 1 weight %, a significant adding effect is not attained. The addition of these elements of higher than 15 weight % adversely affects the sintering property. Accordingly, the content of the elements belonging to IVa (except Zr), Va and VIa groups of the Periodic Table should be in the range of 1 to 15 weight % of the sintered material.

According to the results of the experiments conducted by the present inventors, the mechanical strength and the abrasive resistance of the sintered $Si_3N_4$ are affected by the grain size of $Si_3N_4$. With a larger grain size, the mechanical strength and the abrasive resistance become lowered. If the grain size is larger than 3 microns, the sintered material is degraded in these properties.

Powders of $Si_3N_4$, $ZrO_2$ and $Y_2O_3$ were mixed in various ratios and the thus obtained mixtures were sintered in 1850° C. The mean grain size of the resulting sintered materials was determined and the result is shown in Table 1.

TABLE 1

| $ZrO_2$ (wt %) | $Y_2O_3$ (wt %) | $Si_3N_4$ | mean grain size (micron) |
|---|---|---|---|
| 3 | 1.5 | balance | 1.5 |
| 7 | 3.5 | balance | 2.0 |
| 20 | 10 | balance | 2.8 |
| 30 | 15 | balance | 3.5 |

Further a mixture of powders of 7 vol%$ZrO_2$-3.5 wt%$Y_2O_3$-$Si_3N_4$ was sintered at various temperatures and the grain size of the resulting sintered materials was determined. The result is also shown in Table 2.

TABLE 2

| sintering temperature (°C.) | mean grain size (micron) |
|---|---|
| 1750 | 1.0 |
| 1850 | 2.0 |
| 1950 | 4.0 |

It is understood from the results shown in Tables 1 and 2 that the more the adding amount of the sintering agents such as $ZrO_2$ and $Y_2O_3$ is, the coarser becomes the structure of the sintered material, and that such a grain growth is observed with an increase in the sintering temperature.

From these results also, it is understood that the contents of $Y_2O_3$ and $ZrO_2$ should be respectively in the range of 0.1 to 10 weight % for suppressing the grain growth. In more detail, when the amount of anyone of $Y_2O_3$ and $ZrO_2$ is lower than 0.1 weight %, the sintering of $Si_3N_4$ does not sufficiently proceed, while when the amount of anyone of these sintering agents is higher than 10 weight %, the mechanical strength of the sintered material becomes lowered so that it is not usable for a cutting tool material.

According to the present invention, the sintered $Si_3N_4$ is coated with two layers, that is, the first layer of Ti compound and the second layer of $Al_2O_3$.

The total thickness of these first and second layers should be in the range of 1 to 20 microns, preferably of 3 to 10 microns.

When the total thickness of these two layers is smaller than 1 micron, the improvement in the abrasive resistance is scarecely attained, although the coating cost such as by the CVD method is relatively expensive. On the other hand, when the total thickness of these two coating layers exceeds 20 microns, the coating layers are readily stripped off from the substrate and the mechanical strength of the sintered $Si_3N_4$ is lowered so that the service life time of the tool made therefrom is shortened.

The first layer of Ti compound does not render the second layer of $Al_2O_3$ fragile but it heightens the adhesive strength with the substrate of the sintered $Si_3N_4$. The first coating layer of Ti compound should be of a thickness of higher than 0.5 micron. With the first coating layer of Ti compound of a thickness lower than 0.5 micron, the second coating layer of $Al_2O_3$ would not be adhered with a high strength and thus it tends to be readily stripped off so that such a composite material can not be used as a cutting tool material. On the other hand, when the thickness of the first coating layer of Ti compound exceeds 10 microns, the amount of Ti diffused in the second coating layer of $Al_2O_3$ increases and makes the second layer fragile. Further, the first coating layer of a large thickness would be readily deformed in the course of a high speed cutting operation so that the second coating layer of $Al_2O_3$ can not follow such deformation to cause the breakaway of the tool. Moreover, with a first coating layer of a thickness exceeding 10 microns, a larger thermal stress is generated in the course of cutting operation so that the tool would be readily broken out, due to the difference of the heat conductivity between the coating layers and the substrate.

The thickness of the second coating layer of $Al_2O_3$ should be higher than 0.5 micron, preferably higher than 1 micron. With a thickness smaller than 0.5 micron, the excellent properties of the second coating layer of $Al_2O_3$ can not be effectively endowed to the coating substrate. On the other hand, if the thickness of the second coating layer of $Al_2O_3$ exceeds 10 microns, there arises a large temperature gradient in the direction of the thickness of the coating due to the difference of the heat conductivity with the substrate ($Si_3N_4$) so that a large thermal stress is generated and cracking readily occurs.

After all, according to the present invention, the properties of both of the substrate and the coating layers are optimized so as to provide a composite sintered material having an optimal abrasive resistance for cutting cast iron and a long service life time, while retaining excellent properties of $Si_3N_4$.

The process of producing the composite sintered material according to the present invention will be explained in the following:

First, $Si_3N_4$, $Y_2O_3$, $ZrO_2$, preferably stabilized $ZrO_2$, and if necessary at least one member selected from the group consisting of carbide, nitride and solid solution thereof of the elements belonging to IVa (except Zr), Va and VIa groups of the Periodic Table are mixed in a certain ratio and ground and mixed sufficiently by means of a ball mill, etc.

Next, the resulting mixture is sintered by various methods which are selected depending upon the required physical properties of the product. In the case of the cutting tool material for which high mechanical strength is required, the hot pressing method is most suitable. When the adding amount of the sintering agents is low, it is preferable to conduct the sintering by the hot isostatic pressing (HIP) method. Further the sintering may be conducted by other methods such as the reactive sintering method or the normal pressure sintering method.

For mixing $Si_3N_4$ with the sintering agent, a ball mill made of the same chemical composition as the sintering agent may be used so that a mixture of $Si_3N_4$ and the sintering agent can be obtained only by ball milling the $Si_3N_4$ powder.

The sintering should be conducted at a temperature lower than the sublimation and decomposition temperature of $Si_3N_4$, that is, lower than 1800° C., preferably at a temperature between 1650° C. and 1800° C.

The layers of Ti compound and $Al_2O_3$ may be applied by anyone of the sputtering method, the chemical vapor depositing (CVD) method and the plasma CVD method, etc.

The present invention will be explained in more detail by way of Example which illustrates the present invention for representing the effect of the present invention. Thus, the example should not be construed to restrict the scope of the invention.

EXAMPLE

Powder mixtures containing $Si_3N_4$, $Y_2O_3$, $ZrO_2$, and if necessary at least one member selected from the group consisting of carbide, nitride and solid solution thereof of the elements of IVa (except Zr), Va, VIa groups of the Periodic Table in the ratios shown in Table 3 were prepared and ground by the ball mill for 48 hours and then dried. Each of the obtained powder mixtures was hot pressed to obtain a sintered specimen having a size of 14 mm×14 mm×6 mm. The thus obtained sinters were ground by a diamond grinding wheel to provide a throw-away-tip of SNG 432 of the Japanese Industrial Standards. Subsequently each of the throw-away-tips was applied with coating layers as shown in Table 3 by the chemical vapor depositing method.

Each of the above throw away tips was subjected to a cutting test to determine the service life time thereof. The result is shown in Table 3. The condition of the cutting test is as follows:

Condition of cutting test feed rate: 0.36 mm/rotation
employed machine: IKEGAI NC lathe
cutting speed: 500 m/minute
depth of cut: 2.0 mm
material to cut: FC25 of JIS having a diameter of 300 mm and a length of 1,000 mm
holder: FN 11R-44A
abrasion thickness to determine the service life time: 0.2 mm

TABLE 3

| Specimen No. | $Y_2O_3$ (wt %) | $ZrO_2$ (wt %) | Compound of IVa, Va VIa group | First and second layer | Service life time (minutes) |
| --- | --- | --- | --- | --- | --- |
| 1* | 0.05 | 0.05 | none | 2 μTiC — 2 μAl$_2$O$_3$ | 5 |
| 2* | 0.05 | 5.0 | none | 2 μTiC — 2 μAl$_2$O$_3$ | 10 |
| 3* | 5.0 | 0.05 | none | 2 μTiC — 2 μAl$_2$O$_3$ | 10 |
| 4 | 1.0 | 1.0 | none | 2 μTiC — 2 μAl$_2$O$_3$ | 20 |
| 5 | 5.0 | 5.0 | none | 2 μTiC — 2 μAl$_2$O$_3$ | 25 |
| 6 | 10.0 | 1.0 | none | 2 μTiC — 2 μAl$_2$O$_3$ | 20 |
| 7 | 1.0 | 10.0 | none | 2 μTiC — 2 μAl$_2$O$_3$ | 20 |
| 8* | 12.0 | 5.0 | none | 2 μTiC — 2 μAl$_2$O$_3$ | 12 |
| 9* | 20.0 | 5.0 | none | 2 μTiC — 2 μAl$_2$O$_3$ | 10 |
| 10* | 12.0 | 12.5 | none | 2 μTiC — 2 μAl$_2$O$_3$ | 10 |
| 11* | 5.0 | 5.0 | none | none | 8 |
| 12* | 5.0 | 5.0 | none | only 0.5 μTiC | 9 |
| 13* | 5.0 | 5.0 | none | 0.5 μTiC — 0.5 μAl$_2$O$_3$ | 20 |
| 14* | 5.0 | 5.0 | none | only 0.5 μAl$_2$O$_3$ | 8 |
| 15* | 5.0 | 5.0 | none | only 3 μTiC | 12 |
| 16 | 5.0 | 5.0 | 6.5 TiN | 10 μTiC — 8 μAl$_2$O$_3$ | 65 |
| 17 | 5.0 | 5.0 | 6.5 TiC | 10 μTiC — 8 μAl$_2$O$_3$ | 70 |
| 18 | 5.0 | 5.0 | 6.5 WC | 10 μTiC — 8 μAl$_2$O$_3$ | 65 |
| 19 | 5.0 | 5.0 | 6.5 TiCN | 10 μTiC — 8 μAl$_2$O$_3$ | 70 |
| 20 | 5.0 | 5.0 | 30 TiN | 10 μTiC — 8 μAl$_2$O$_3$ | 15 |
| 21 | 5.0 | (8 mol % $Y_2O_3$ — $ZrO_2$) 5.0 | 6.5 TiN | 2 μTiC — 2 μAl$_2$O$_3$ | 25 |
| 22 | 5.0 | (8 mol % $Y_2O_3$ — $ZrO_2$) | 6.5 TiN | 2 μTiC — | 30 |

TABLE 3-continued

| Specimen No. | $Y_2O_3$ (wt %) | $ZrO_2$ (wt %) | Compound of IVa, Va VIa group | First and second layer | Service life time (minutes) |
|---|---|---|---|---|---|
| 23 | 5.0 | 10.0 (8 mol % CaO — $ZrO_2$) | 6.5 TiN | 2 μ$Al_2O_3$ 2 μTiC — | 25 |
| 24 | 5.0 | 5.0 (8 mol % MgO — $ZrO_2$) | 6.5 TiN | 2 μ$Al_2O_3$ 2 μTiC — | 30 |
| 25 | 5.0 | 5.0 (8 mol % $Y_2O_3$ — $ZrO_2$) | none | 2 μ$Al_2O_3$ 2 μTiC — | 25 |
| 26* | 5.0 | 5.0 | none | only 3 μ$Al_2O_3$ | 10 |
| 27 | 5.0 | 5.0 | none | 3 μTiC — 5 μ$Al_2O_3$ | 30 |
| 28 | 5.0 | 5.0 | none | 10 μTiC — 8 μ$Al_2O_3$ | 35 |
| 29* | 5.0 | 5.0 | none | 10 μTiC — 20 μ$Al_2O_3$ | 15 |
| 30 | 5.0 | 5.0 | none | 2 μTiC — 2 μ$Al_2O_3$ | 25 |
| 31 | 5.0 | 5.0 | none | 2 μTiCN — 2 μ$Al_2O_3$ | 25 |
| 32* | 5.0 | 5.0 | none | 2 μ$Al_2O_3$ 2 μTiC | 15 |
| 33* | | 5 wt % $Al_2O_3$ + 5 wt % $Y_2O_3$ | none | 2 μTiC — 2 μ$Al_2O_3$ | 15 |
| 34* | | 5 wt % $Al_2O_3$ 5 wt % MgO | none | 2 μTiC — 2 μ$Al_2O_3$ | 12 |
| 35* | | 5 wt % MgO | none | 2 μTiC — 2 μ$Al_2O_3$ | 10 |
| 36* | | 5 wt % $Al_2O_3$ — 3 wt % AlN — 5 wt % $Y_2O_3$ | none | 2 μTiC — 2 μ$Al_2O_3$ | 15 |
| 37 | 5.0 | 5.0 | 6.5 TaN | 10 μTiC — 8 μ$Al_2O_3$ | 65 |
| 38 | 5.0 | 5.0 | 6.5 VC | 10 μTiC — 8 μ$Al_2O_3$ | 60 |
| 39 | 5.0 | 5.0 | 6.5 TiC — 6.5 WC | 10 μTiC — 8 μ$Al_2O_3$ | 65 |
| 40 | 5.0 | 5.0 | 6.5 TiC — 6.5 TiN | 10 μTiC — 8 μ$Al_2O_3$ | 70 |
| 41 | 5.0 | 5.0 | 13 ZrN | 10 μTiC — 8 μ$Al_2O_3$ | 60 |

*indicates the results of the control specimens.

It is understood from the result shown in Table 3 that the $Si_3N_4$ cutting tool according to the present invention is sufficiently excellent with respect to the abrasive resistance in which the $Si_3N_4$ cutting tool of the prior art is degraded. For example, the specimens according to the present invention had a service life time of at least 20 minutes, while the service life time of the control specimens was at most 15 minutes and in some specimens 5 minutes or less. That is one fourth or less than that of the specimens according to the invention.

From the above test result, it is seen also that, unless both of the two conditions mentioned below are not satisfied at the same time, a sufficient abrasive resistance, in other word, a long service life time of the cutting tool is not attained. The above first condition is to add $Y_2O_3$ and $ZrO_2$ respectively in an amount 0.1 to 10 weight % and the second condition is to form two coating layers with a total thickness of 1 to 20 microns.

Concerning the content of the sintering agents, it is understood from the results of the specimens Nos. 2, 3, 8 and 9 that the content of $Y_2O_3$ and $ZrO_2$ should be respectively in the above mentioned range at the same time for obtaining a cutting tool of a long life time. Further it is understood from the results of the specimens Nos. 32, 33 and 35 that the cutting tool which contains $Al_2O_3$ as a sintering agent does not present a sufficient abrasive resistance, even if the above second condition for the coating layers is satisfied.

As explained above, the composite sintered material according to the present invention is accomplished by optimizing the chemical composition of the $Si_3N_4$ substrate and at the same time the chemical compositions and the thickness of the coating layers to improve the abrasive resistance of $Si_3N_4$ base ceramics without degrading the excellent mechanical properties of the $Si_3N_4$ ceramics such as fracture toughness and heat impact resistance.

Accordingly, the composite sintered material according to the present invention is suitable as a cutting tool material for cutting steel or cast iron etc.

We claim:

1. Composite sintered $Si_3N_4$ material consisting of:
    a sintered $Si_3N_4$ substrate containing 0.1 to 10 weight % of $Y_2O_3$, 0.1 to 10 weight % of $ZrO_2$ and 1 to 15 weight % of at least one member selected from the group consisting of carbide, nitride and carbonitride and solid solution thereof of elements of IVa (except Zr), Va and VIa of the Periodic Table and the balance being of $Si_3N_4$;
    a first layer of Ti compound coated on the sintered $Si_3N_4$ substrate;
    a second layer of $Al_2O_3$ coated on the first layer; and the total thickness of the first and second layers being in the range of 1 to 20 microns.

2. Composite sintered $Si_3N_4$ material as claimed in claim 1, wherein $ZrO_2$ has been stabilized to cubic $ZrO_2$.

3. Composite sintered $Si_3N_4$ material as claimed in claim 2, wherein $ZrO_2$ has been stabilized to cubic $ZrO_2$ by the addition of at least one member selected from the group consisting of CaO, MgO and $Y_2O_3$.

4. Composite sintered $Si_3N_4$ material as claimed in claim 1, wherein the mean grain size of the sintered $Si_3N_4$ substrate is smaller than 3 microns.

5. Composite sintered $Si_3N_4$ material as claimed in claim 1, wherein the first and second layers have respectively a thickness of 3 to 10 microns.

6. Composite sintered $Si_3N_4$ material as claimed in claim 5, wherein the first and second layers have a substantially same thickness with each other.

7. Composite sintered $Si_3N_4$ material as claimed in claim 1, wherein the first layer has a thickness of 0.5 to 10 microns.

8. Composite sintered $Si_3N_4$ material as claimed in claim 1, wherein the second layer has a thickness of 1 to 10 microns.

9. Composite sintered $Si_3N_4$ material as claimed in claim 1, wherein the first layer includes at least one member selected from the group consisting of Ti carbide, Ti nitride, Ti carbonitride, Ti oxide and the solid solution thereof.

10. Cutting tool mainly for use in cutting cast iron at high speed and comprising a blade tip of composite sintered $Si_3N_4$ material consisting of
    a sintered $Si_3N_4$ substrate containing 0.1 to 10 weight % of $Y_2O_3$, 0.1 to 10 weight % of $ZrO_2$ and 1 to 15 weight % of at least one member selected from the group consisting of carbide, nitride and carbonitride and solid solution thereof of elements of IVa (except Zr), Va and VIa of the Periodic Table and the balance being of $Si_3N_4$;
    a first layer of Ti compound coated on the sintered $Si_3N_4$ substrate;
    a second layer of $Al_2O_3$ coated on the first layer; and the total thickness of the first and second layers being in the range of 1 to 20 microns.

11. Cutting tool as claimed in claim 10, wherein $ZrO_2$ has been stabilized to cubic $ZrO_2$.

12. Cutting tool as claimed in claim 11, wherein $ZrO_2$ has been stabilized to cubic $ZrO_2$ by the addition of at least one member selected from the group consisting of CaO, MgO and $Y_2O_3$.

13. Cutting tool as claimed in claim 10, wherein the mean grain size of the sintered $Si_3N_4$ substrate is smaller than 3 microns.

14. Cutting tool as claimed in claim 10, wherein the first and second layers have respectively a thickness of 3 to 10 microns.

15. Cutting tool as claimed in claim 14, wherein the first and second layers have a substantially same thickness with each other.

16. Cutting tool as claimed in claim 10, wherein the first layer has a thickness of 0.5 to 10 microns.

17. Cutting tool as claimed in claim 10, wherein the second layer has a thickness of 1 to 10 microns.

18. Cutting tool as claimed in claim 10, wherein the first layer includes at least one member selected from the group consisting of Ti carbide, Ti nitride, Ti carbonitride, Ti oxide and the solid solution thereof.

19. Composite sintered $Si_3N_4$ material consisting of:
    a sintered $Si_3N_4$ substrate containing 0.1 to 10 weight % of $Y_2O_3$, 0.1 to 10 weight % of $ZrO_2$ and 1 to 15 weight % of at least one member selected from the group consisting of carbide, nitride and carbonitride and their solid solution of Ti, W, Ta and V and the balance being of $Si_3N_4$;
    a first layer of Ti compound coated on the sintered $Si_3N_4$ substrate;
    a second layer of $Al_2O_3$ coated on the first layer; and the total thickness of the first and second layers being in the range of 1 to 20 microns.

20. Composite sintered $Si_3N_4$ material as claimed in claim 19, wherein $ZrO_2$ has been stabilized to cubic $ZrO_2$.

21. Composite sintered $Si_3N_4$ material as claimed in claim 20, wherein $ZrO_2$ has been stabilized to cubic $ZrO_2$ by the addition of at least one member selected from the group consisting of CaO, MgO and $Y_2O_3$.

22. Composite sintered $Si_3N_4$ material as claimed in claim 19, wherein the mean grain size of the sintered $Si_3N_4$ substrate is smaller than 3 microns.

23. Composite sintered $Si_3N_4$ material as claimed in claim 19, wherein the first and second layers have respectively a thickness of 3 to 10 microns.

24. Composite sintered $Si_3N_4$ material as claimed in claim 23, wherein the first and second layers have a substantially same thickness with each other.

25. Composite sintered $Si_3N_4$ material as claimed in claim 19, wherein the first layer has a thickness of 0.5 to 10 microns.

26. Composite sintered $Si_3N_4$ material as claimed in claim 19, wherein the second layer has a thickness of 1 to 10 microns.

27. Composite sintered $Si_3N_4$ material as claimed in claim 19, wherein the first layer includes at least one member selected from the group consisting of Ti carbide, Ti nitride, Ti carbonitride, Ti oxide and the solid solution thereof.

* * * * *